United States Patent [19]

Bastard et al.

[11] Patent Number: 5,784,233
[45] Date of Patent: Jul. 21, 1998

[54] DIFFERENTIAL PROTECTION DEVICE OF A POWER TRANSFORMER

[75] Inventors: Patrick Bastard; Hugues Regal, both of Gif-sur-Yvette, France

[73] Assignees: Schneider Electric SA; Ecole Superieure d'Electricite Supelec, both of France

[21] Appl. No.: 663,104

[22] PCT Filed: Dec. 26, 1994

[86] PCT No.: PCT/FR94/01531

§ 371 Date: Jun. 28, 1996

§ 102(e) Date: Jun. 28, 1996

[87] PCT Pub. No.: WO95/19059

PCT Pub. Date: Jul. 13, 1995

[30] Foreign Application Priority Data

Jan. 6, 1994 [FR] France ............................. 94 00143

[51] Int. Cl.$^6$ .............................................. H02H 5/00
[52] U.S. Cl. ........................... 361/36; 361/93; 361/115
[58] Field of Search .......................... 361/37, 93, 115, 361/36

[56] References Cited

U.S. PATENT DOCUMENTS 5,014,153 5/1991 Wilkerson ................................ 361/36
5,629,870 5/1997 Farag et al. ......................... 364/551.01

OTHER PUBLICATIONS

IEEE Transactions on Power Delivery, vol. 9, No. 1, Jan. 1994, pp. 434–441, "Training an Artificial Neural Network to Discriminate Between Magnetizing Inrush and Internal Faults."

IEEE Transactions on Power Delivery, vol. 5, No. 3, Jul. 1990, pp. 1299–1308, "A Kalman Filter Based Digital Percentage Differential and Ground Fault Relay for a 3-Phase Power Transformer."

TENCON '93 IEEE Region 10 Conference on Computer, Communication, Control and Power Engineering, vol. 2, Oct. 1993, pp. 754–757, "Detection of Magnetizing Inrush Current Using Artificial Neural Network."

*Primary Examiner*—Jeffrey A. Gaffin
*Assistant Examiner*—Stephen Jackson
*Attorney, Agent, or Firm*—Parkhurst & Wendel

[57] ABSTRACT

A preprocessing circuit receives signals representative of a current circulating in a primary winding and of a current circulating in a secondary winding of a transformer. The signals representative of currents are used to calculate the values of a through current and a differential current. The preprocessing circuit performs a spectral analysis and provides a neural network with signals representative of the fundamental component of the through current, of the fundamental component of the differential current, of the second harmonic and of the fifth harmonic of the differential current. The neural network identifies fault conditions and normal operation states, and supplies a triggering and/or alarm signal to an output when a fault condition is detected.

5 Claims, 4 Drawing Sheets

DIFFERENTIAL PROTECTION DEVICE OF A POWER TRANSFORMER

The invention relates to a differential protection device of a power transformer comprising first measuring means for measuring the current flowing in a primary winding of the transformer, second measuring means for measuring the current flowing in a secondary winding of the transformer, interrupting means connected to the primary winding of the transformer to interrupt the electrical power supply of the transformer and a processing circuit connected to the first and second measuring means, supplying a tripping signal to the interrupting means and/or information signals to annunciation or monitoring means, the processing circuit comprising sampling means connected to the first and second measuring means to sample signals representative of the currents measured in the primary and secondary windings.

Known differential protection devices analyze the currents of the primary and secondary windings of transformer. The object of differential protection is to detect an internal fault between any two turns of the transformer windings or a fault between a turn and ground of the transformer. The faults are detected by measuring a differential current representative of the current difference between the current flowing in the primary windings and the current flowing in the secondary windings, taking account of the transformation ratio and of the coupling. A through-current, also called passing current, representative of a mean value between the currents flowing in the primary and secondary windings, more or less the transformation ratio and of the coupling, is also used.

The differential protection used in tripping relays causes breaking of an electrical power supply connected to the primary winding of the transformer. Generally a tripping order is produced if tripping conditions are verified, for example when the differential current is greater than a preset threshold or when it exceeds a fraction of the through-current. The differential and through-currents are pre-processed so as to keep only the fundamental component of the signals, at the frequency of the current supplied by the electrical power supply of the transformer.

The tripping conditions alone are not sufficient to ensure correct operation of differential protection devices. On power-up, notably, a remanent flux in a magnetic circuit of the transformer can cause saturation of the magnetic circuit according to the closing phase of the supply voltage and supply very high transient differential current measurements. In continuous operation at high voltage levels the magnetic circuit of the transformer can also saturate and make the differential current measurement false. In certain devices, primary and secondary current measuring means comprise a magnetic circuit which saturate at high current levels and supply wrong measurements.

Conventional electronic relays comprising analog or digital circuits enable certain transient or continuous operating states representing events other than faults to be identified, but do however generate a differential current due for example to saturation of the magnetic circuit of the transformer or of the measurement sensors, in order to prevent spurious trips. However taking all the operating cases fully into account would lead to very complex and costly circuits or algorithms, and/or very high response times, for an efficient differential protection of the transformers.

The object of the invention is to achieve a fast and inexpensive transformer differential protection device able to differentiate between a large number of operating situations and tripping conditions.

This object is achieved by the fact that the processing circuit comprises pre-processing means connected to the sampling means and a neuron network comprising inputs connected to the pre-processing means and at least one output to supply the tripping and/or information signals, the pre-processing means supplying to the neuron network signals representative of the fundamental component, of the second harmonic and of the fifth harmonic of a differential current and a signal representative of the through-current.

According to a development of the invention, the pre-processing means supply to the neuron network signals representative:

- of the ratio between the fundamental component of the differential current and the fundamental component of the through-current,
- of the ratio between the fundamental component of the differential current and the value of a signal representative of a rated current,
- of the ratio between the second harmonic of the differential current and the fundamental component of the differential current,
- of the ratio between the fifth harmonic of the differential current and the fundamental component of the differential current.

In a preferred embodiment the neuron network is of the multilayer perceptron type comprising three layers of neurons, four inputs per current phase to be monitored and a tripping and/or annunciation signal output, the four inputs being connected to a first layer comprising three neurons, the output being connected to a third layer comprising one neuron, a second layer comprising two neurons being connected to the first and third layer.

The neurons of the neuron network comprise coefficients computed during a learning cycle, the values of the signals applied to the inputs of the neuron network being representative of internal fault situations, of external fault situations, of normal operating situations and of transformer power-up situations.

According to a particular embodiment, the neuron network comprises at least one annunciation output to indicate the presence of an internal fault between turns of a winding of the transformer, of an internal fault between a turn of a winding and the ground of the transformer, and/or of an external fault.

Other advantages and features will become more clearly apparent from the following description of illustrative embodiments of the invention, given as non-restrictive examples only and represented in the accompanying drawings in which.

Figure 1:
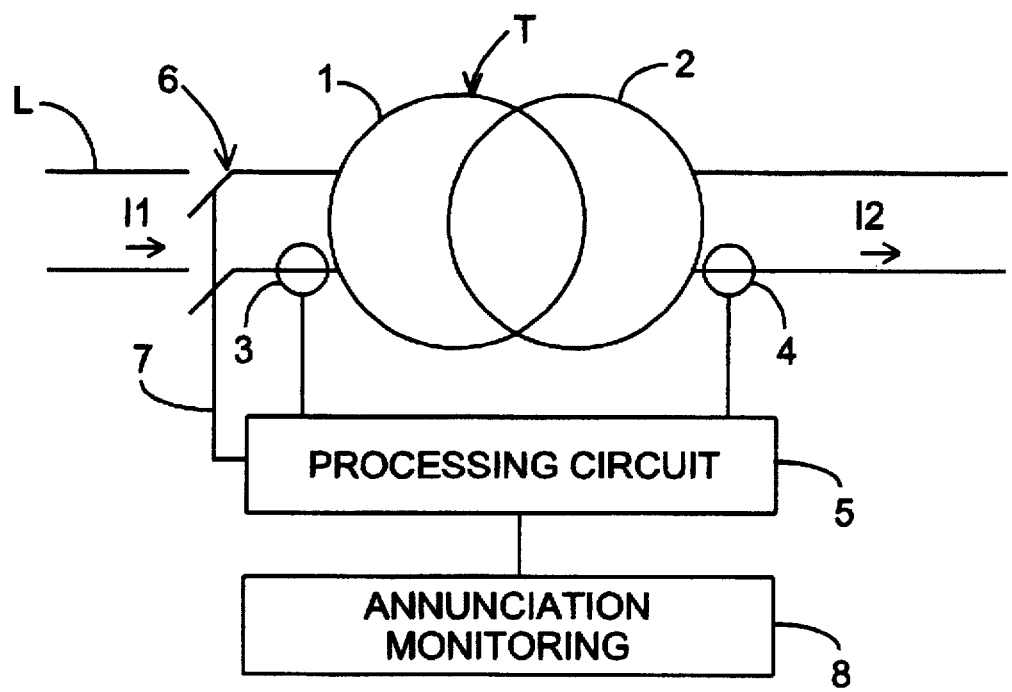
FIG. 1 represents a block diagram of a transformer differential protection device of known type.

In FIG. 1 a differential protection device of a transformer T comprises a processing circuit 5, a current sensor 3 for measuring the primary current I1 supplied to the primary winding 1 of the transformer by an electrical supply line L, a current sensor 4 for measuring a secondary current I2 output from a secondary winding 2 of the transformer and a device 6 for interrupting the electrical power supply of the transformer. The two current sensors 3 and 4 are connected to inputs of the processing circuit which supplies a tripping order 7 to the interrupting device 6 if certain tripping conditions are verified. The device 6, connected between the power supply line L and the primary winding 1 of the transformer interrupts the current flow in the transformer 1 by opening of the contacts. The processing circuit can also be connected to a fault indication circuit 8.

The most common faults detected by differential protection devices are insulation or short-circuit faults between the turns of the primary or secondary windings or between turns and grounds of the transformer.

Figure 2:
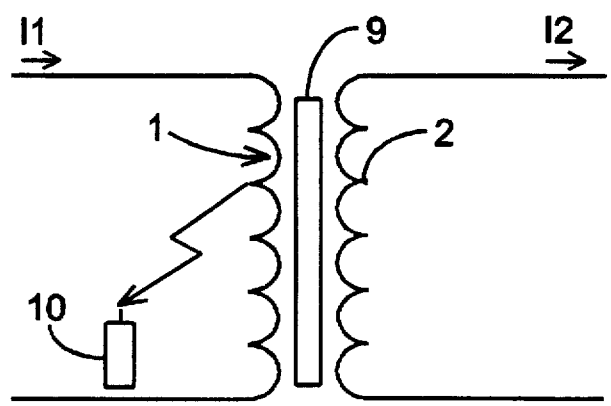
FIG. 2 shows modelling of a fault in the a transformer.

FIG. 2 shows a diagram of a faulty transformer. The current I1 passes through the primary winding 1 comprising a number of turns N1 and the current I2 is generated in the secondary winding 2 comprising a number of turns N2. The two windings are coiled on a magnetic circuit 9. In the diagram a fault of the primary winding is modelled by a resistive short-circuit 10 between a turn and an end of the winding 1.

Differential protection consists in detecting a differential current Id and in making the device trip if certain tripping conditions are verified. The expression of the differential current is:

$$Id = I1 - (N2/N1)I2 \qquad (1)$$

The differential current is compared to a through-current Ir, the expression of the through-current being:

$$Ir = \tfrac{1}{2}(I1 + (N2/N1)I2) \qquad (2)$$

According to a tripping condition the absolute value of the differential current |Id| must be greater than a fraction K of the absolute value of the through-current |Ir|. To avoid detecting random faults with low through-current levels, the differential current is also compared to a threshold Im.

The expression of the tripping conditions is given by:

$$|Id| > K|Ir| \text{ and } |Id| > Im \qquad (3)$$

The values of the currents |Id| and |Ir| are processed so as to keep only the fundamental component defined by the frequency of the supply line current and voltage, for example 50 Hz or 60 Hz.

In particular operating cases, the tripping condition 3 is not sufficient to ensure correct operation of the device. When the transformer is powered on, depending on the value of a remanent flux in the magnetic circuit 9 and the making phase of a voltage in the primary winding, the magnetic circuit may saturate. This saturation results in the occurrence of a transient differential current which may make the device trip whereas there is no fault. Certain known devices disable tripping during a preset time at power-on. However this solution leads to a prejudicial processing delay if the transformer has a fault.

In steady operating conditions, an external fault may result in a voltage increase and saturate the magnetic circuit. Saturation introduces a false measurement of the differential current without an internal fault in the transformer. The current increase above the rated current of the transformer also affects the linearity of the current sensors 3 and 4. The sensors, generally formed by current transformers, have a magnetic circuit which saturates when the current to be measured increases.

The various operating cases can be identified by means of a spectral analysis of the currents I1, I2 or of the differential current Id. However, global processing of the protection is not easy to achieve practically with conventional analog or digital electronic circuits.

In a first embodiment of the invention (FIG. 3), the protection device comprises a sampling circuit 11 connected to the current sensors 3 and 4, a pre-processing circuit 12 connected to the sampling circuit 11 and a neuron network 13 comprising four inputs E1, E2, E3, E4 connected to the pre-processing circuit. An output S of the neuron network is connected to a relay 14 which causes opening of the interrupting device 6. The output S can also be connected to a display device 15.

The sampling circuit 11 samples with a sampling period Te signals representative of the primary current I1 and secondary current I2, and supplies the samples to the pre-processing circuit 12. The samples of the current signals I1 and I2 are used for computing the differential current Id and the through-current Ir according to the expressions 1 and 2. The circuit 12 performs a spectral analysis of the signals according to a sliding window method. At each sampling period Te, a set of the last samples collected during a period T1 corresponding to the duration of the window is used for the spectral analysis. The period T1 is equivalent to the period of the fundamental frequency of the current I1 supplied to the transformer, for example 50 or 60 Hz. The spectral analysis performed by the circuit 12 determines signals representative of the fundamental component H1D of the differential current, of the component of the second harmonic H2D (100 Hz or 120 Hz) of the differential current, of the component of the fifth harmonic H5D (250 Hz or 300 Hz) of the differential current and of the fundamental component H1R of the through-current.

The signals can, in a first embodiment, be applied to the inputs of the neuron network. The input E1 then receives a signal representative of H1D, the input E2 a signal representative of H2D, the input E3 a signal representative of H5D and the input E4 a signal representative of H1R.

However, in other embodiments, a first computation performed in the circuit 12 enables the signals H1D, H2D, H5D and H1R to be combined so as to characterize the values of the signals efficiently. In a preferred embodiment, the pre-processing circuit performs the following combinations:

Computation of the ratio of the fundamental component H1D of the differential current over the fundamental component H1R of the through-current $$H1D/H1R \qquad (4).$$

Computation of the ratio of the fundamental component H1D of the differential current over a signal In representative of the rated current of the transformer $$H1D/In \qquad (5).$$

Computation of the ratio of the second harmonic H2D over the fundamental component of the differential current $$H2D/H1D \qquad (6).$$

Computation of the ratio of the fifth harmonic H5D over the fundamental component H1D of the differential current $$H5D/H1D \qquad (7).$$

The pre-processing circuit 12 then supplies on the input E1 a signal representative of the ratio H1D/H1R, on the input E2 a signal representative of the ratio H1D/In, on the input E3 a signal representative of the ratio H2D/H1DD and on the input E4 a signal representative of the ratio H5D/H1D. The neuron network receives the input signals and determines the value of the output S according to situations learnt in a learning phase. In real operation the network has to differentiate healthy situations from faulty situations which must give rise to tripping.

Figure 3:
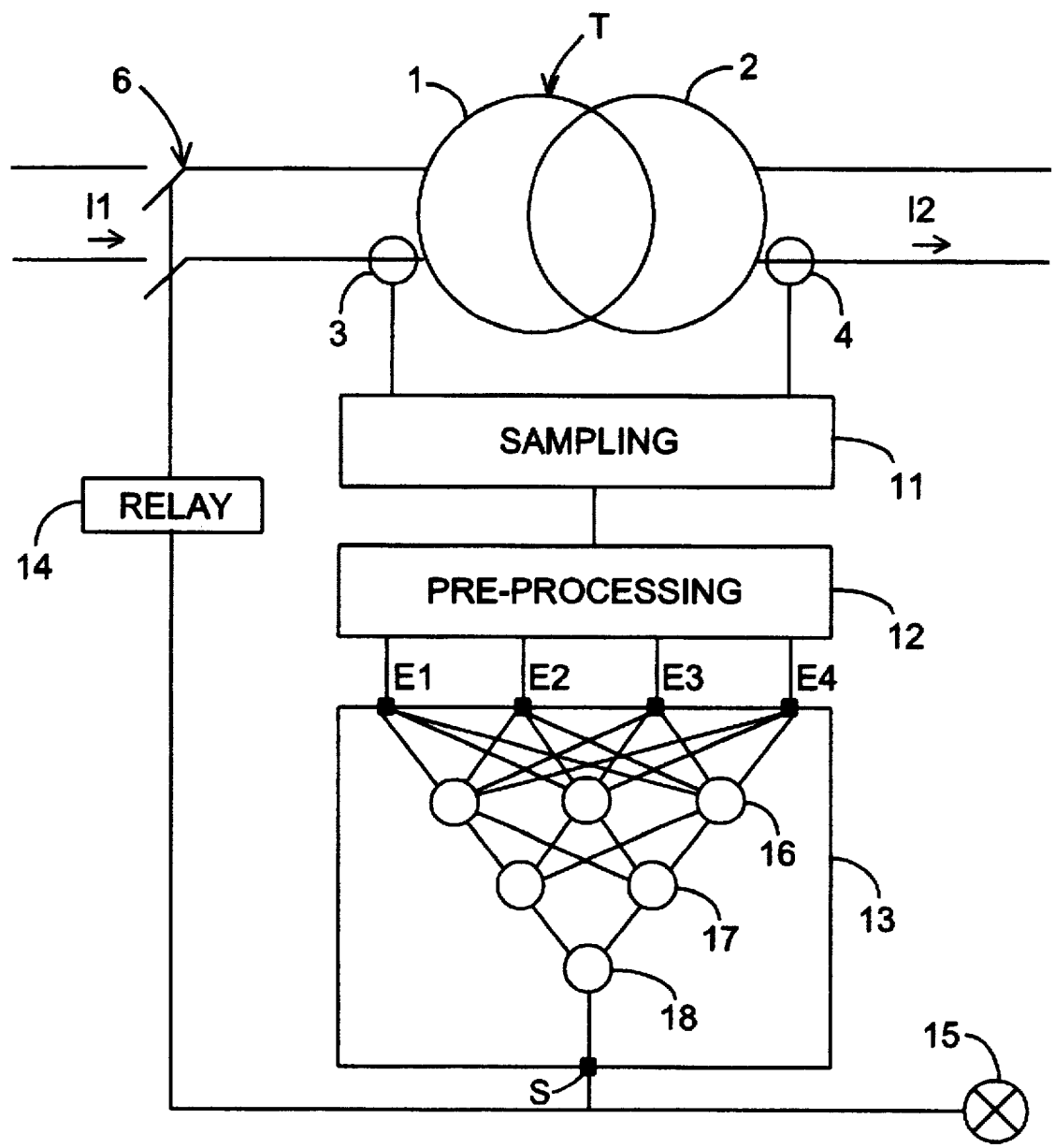
FIG. 3 represents a protection device according to a first embodiment of the invention, for a single-phase transformer.

The neuron network 13 of the multilayer perceptron type comprises three layers of neurons. A first layer 16 comprises neurons connected to the inputs of the network 13. A second layer 17 constitutes an internal layer and a third layer 18 is connected to the output. The neurons of the second layer are connected to the neurons of the first and third layer. In the embodiment of FIG. 3, the network 13 comprises three neurons in the first layer, two neurons in the second layer and one neuron in the third layer. Each neuron has coefficients set in a learning cycle wherein the main operating and fault situations are presented.

In the case of differential protection of a transformer, a situation is considered as a fault if it represents an internal fault of the transformer. The other situations are considered as healthy situations even if external faults may occur. The output of the neuron network is defined for values situated between −1 and 1. In the course of learning the healthy situations are characterized by an output value of about −0.8 and the fault situations by values of about +0.8. In real operation, positive values of the neuron network output give a tripping order.

Figure 4:
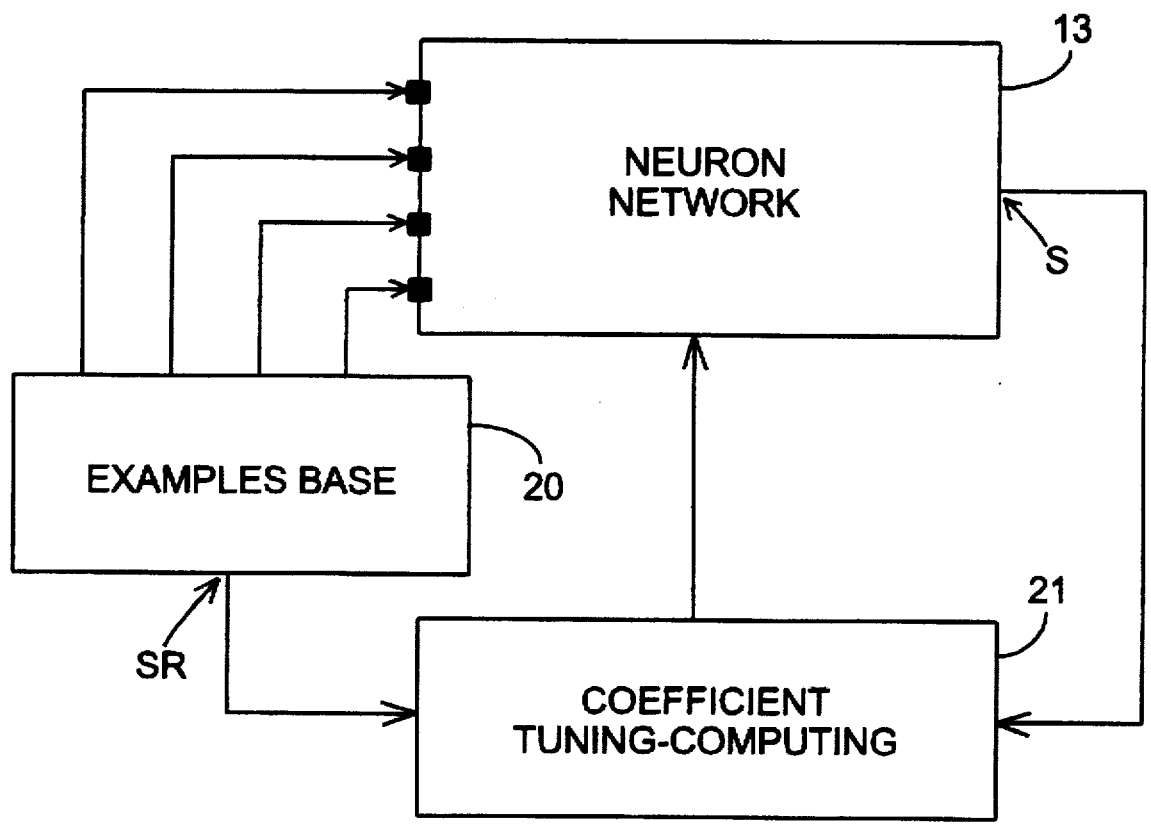
FIG. 4 illustrates the learning method of a neuron network designed to be integrated in the device of FIG. 3.

During the learning phase of the neuron network, signals representative of the through-current and of the differential current, notably the signals H1D/H1R, H1D/In, H2D/H1D and H5D/H1D, are applied to the inputs. The coefficients of the neuron network are then modified so that the output value of the network is closest to the value of a reference output corresponding to the situation defined by the values of the input signals. Learning is performed by means of several operating and fault cases presented several times. FIG. 4 shows an automated learning of a neuron network 13 able to be used in the differential protection device of FIG. 3. An example base 20 comprises all the situations that the network 13 has to learn. For each situation, the base comprises the values of the four signals applied to the inputs and the value of a corresponding reference output SR. The output S of the neuron network and the reference output SR of the example base are connected to a neuron coefficient adjustment device 21. The device 21 compares the two outputs and parameters the coefficients so as to obtain an output value S of the network the closest possible to the value of the reference output SR. The example base situations are used sequentially and/or simultaneously for learning of the neuron network.

The example base 20 comprises about one thousand examples of different situations. These situations can be classified in several classes, for example:

normal operation, no-load or on-load, transformer power-up, external fault, internal fault between winding turns, internal fault between a winding turn and ground.

The examples are chosen so that the neuron network can detect a faulty situation within a maximum time of 20 ms after the fault has occurred.

The embodiment of FIG. 3, given as an example, is used with a single-phase transformer T or with the windings of a phase a a multi-phase transformer. In another embodiment, represented in FIG. 5, a differential protection device is used for a three-phase transformer T3. Three current sensors 3a, 3b, 3c measure primary currents I1A, I1b, I1c of three phases a, b and c supplying the three-phase primary winding 31. Three sensors 4a, 4b, 4c measure currents I2a, I2b, I2c output from a three-phase secondary winding 32. The current sensors are connected to a sampling circuit 22. An output of the circuit 22 is connected to a pre-processing circuit 23 which performs a spectral analysis and computes the differential currents and through-currents. A neuron network 24 comprises inputs connected to the circuit 23, an output S connected to a tripping relay 14 and auxiliary outputs S1, S2, S3, S4, S5 connected to an annunciation circuit 25.

Figure 5:
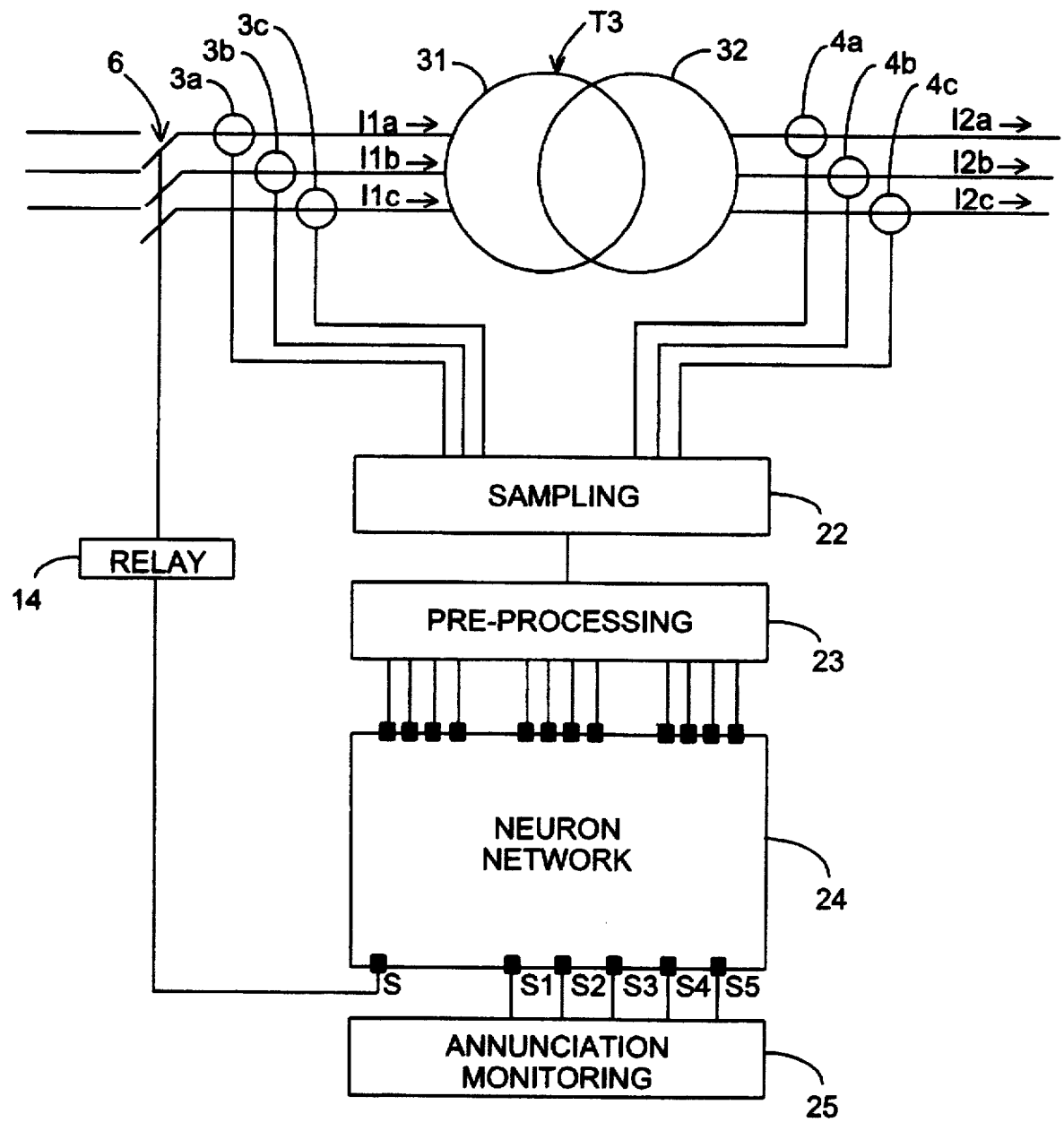
FIG. 5 represents a protection device according to a second embodiment, for a three-phase transformer.

The pre-processing circuit 23 can generate the same signals as the circuit 12 of FIG. 3 for each of the three phases of the transformer T3 or perform other signal combinations representative of the fundamental components or harmonics of the differential or through-currents. In the same way the neuron network 24 can comprise three replicas of the network 13 in parallel or comprise a different global organisation taking account of the set of signals from the inputs. In the embodiment of FIG. 5, the network 24 supplies on its auxiliary outputs 51 to 55 information on the presence and nature of a fault detected for each of the phases of the transformer. The annunciation circuit 25 then indicates the situations detected by the neuron network separately, for example the following situations or faults:

fault between winding turns on the primary, phase a, b and /or c, fault between winding turns on the secondary, phase a, b and/or c, fault between a winding turn and ground on the primary, phase a, b and/or c, fault between a winding turn and ground on the secondary, phase a, b and/or c, or healthy situations:

power-up, normal operation, external fault, phase a, b an d/or c.

The differential protection device described above can apply to any type of electrical transformer whatever the primary or secondary voltages and currents and the coupling of the primary or secondary windings. In meshed networks the power supply breaking devices can be equally well connected to the primary windings and to the secondary windings of the transformer.

The pre-processing circuits 12 and 23 generate, in the embodiments above, signals representative of the through-current and of the fundamental component, of harmonic 2 and harmonic 5 of the differential current, but other signals can also be used to complete the differential protection.

The situations identified by the neuron networks 13 and 24 are not limited to those described above, and can be adapted to particular uses according to the transformer used.

The sensors used by the above devices are current sensors only, but it is also possible to add other sensors to tune the protection finely. For example the devices can be completed by adding sensors to measure the primary and secondary voltages or sensors measuring the temperature, pressure or gas discharge inside the transformer.

Implementation of the differential protection device can be achieved independently as in the embodiments described above or be integrated and associated to other types of protection such as for example overload or external short-circuit protection.

We claim:

1. A differential protection device of a power transformer comprising first measuring means for measuring the current flowing in a primary winding of the transformer, second measuring means for measuring the current flowing in a secondary winding of the transformer, interrupting means connected to the primary winding of the transformer to interrupt the electrical power supply of the transformer and a processing circuit connected to the first and second measuring means, supplying a tripping signal to the interrupting means and/or information signals to annunciation or monitoring means, the processing circuit comprising sampling means connected to the first and second measuring means to sample signals representative of the currents measured in the primary and secondary windings, the processing circuit further comprising pre-processing means connected to the sampling means and a neuron network comprising inputs connected to the pre-processing means and at least one output to supply the tripping and/or information signals, the pre-processing means supplying to the neuron network signals representative of the fundamental component, of the second harmonic and of the fifth harmonic of a differential current and a signal representative of a through-current.

2. The protection device according to claim 1, wherein the pre-processing means supplies to the neuron network signals representative:

- of the ratio between the fundamental component of the differential current and the fundamental component of the through-current,
- of the ratio between the fundamental component of the differential current and the value of a signal representative of a rated current,
- of the ratio between the second harmonic of the differential current and the fundamental component of the differential current,
- of the ratio between the fifth harmonic of the differential current and the fundamental component of the differential current.

3. The protection device according to claim 1, the neuron network is a perceptron type comprising three layers of neurons, four inputs per current phase to be monitored and a tripping and/or annunciation signal output, the four inputs being connected to a first layer (16) comprising three neurons, the output being connected to a third layer comprising one neuron, a second layer comprising two neurons and being connected to the first and third layer.

4. The protection device according to claim 1 wherein the neurons of the neuron network comprise coefficients computed during a learning cycle, the values of the signals applied to the inputs of the neuron network being representative of internal fault situations, of external fault situations, of normal operating situations and of transformer power-up situations.

5. The protection device according to claim 1 wherein the neuron network comprises at least one annunciation output for indication the presence of an internal fault between turns of a winding of the transformer, of an internal fault between a turn of a winding and the ground of the transformer, and/or of an external fault.

* * * * *